B. H. HORN.
Lamp.

No. 2,641.

Patented May 26, 1842.

UNITED STATES PATENT OFFICE.

BENJN. H. HORN, OF BOSTON, MASSACHUSETTS.

LARD-LAMP.

Specification of Letters Patent No. 2,641, dated May 26, 1842.

*To all whom it may concern:*

Be it known that I, BENJAMIN H. HORN, of Boston, in the county of Suffolk and State of Massachusetts, having invented new and useful Improvements in "Solar-Lamps" for Burning Lard or other Concrete Substances, and that the following description, taken in connection with the accompanying drawings, hereinafter referred to, forms my specification.

In said specification I have set forth the nature and principles of my said invention, by which it may be distinguished from others of a similar nature, together with such parts or combinations as I claim and for which I solicit an exclusive property, to be secured to me by Letters Patent.

The figures of the accompanying plate of drawings represent my improvements.

Figure 1:
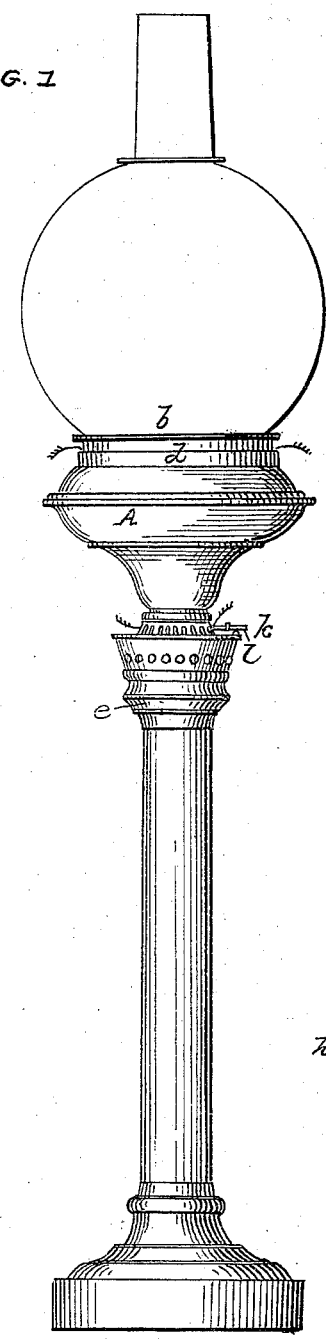
Figure 2:
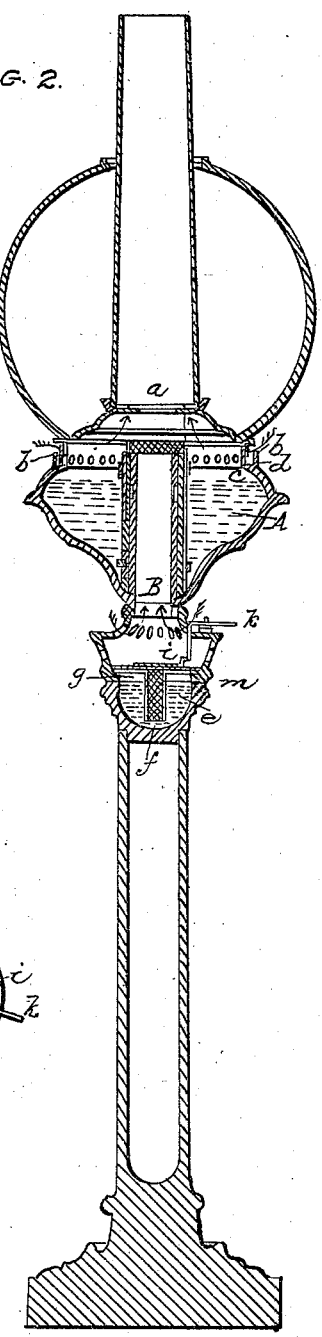
Figure 3:
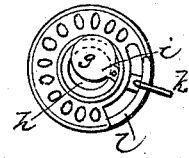

Figure 1, is a side elevation. Fig. 2 is a central transverse vertical section, and Fig. 3 is a detailed plan of the secondary lamp, &c., which will be explained in the sequel.

The fountain A, and parts connected to the same, are in every way substantially similar to those of the common solar and argand lamp, the flame being supplied with a double (or inner and outer) current of air as shown by the blue arrows in Fig. 2. The flame is contracted in the usual manner, as in the invention called the solar lamp, just above the top of the wick as shown at *a*, and the mouth or opening at the top of the fountain is made somewhat larger than usual as seen in Fig. 2, for the sake of convenience in filling it with the lard or concrete substance.

On the outside of the rim *b*, through which the upper air holes are formed a trough *c* is made by means of the rim *d* attached to the exterior of the fountain, and extending entirely around the same. This trough serves to catch any of the concrete substance which may adhere to the rim *b*, in scraping said substance off from the knife or other implement over the said rim into the fountain, the particles so adhering melting when the lamp is lighted, and collecting in the trough, from which it passes through the air holes of the rim *b* into the fountain instead of running down over the exterior of the fountain, which would be the case but for the above described remedial provision.

Beneath the main fountain A and just below the points where the lower and inner current of air is admitted, a secondary, and spirit or oil fountain or lamp is placed, as shown at *e*, in which a common wick tube and wick is arranged as shown at *f* Fig. 2. This wick is lighted a little before the main lamp, and the flame or blaze from the same, extending upward into the interior tube B of the burner, in a very short time serves to melt or liquefy the substance, in the fountain A, about the burner, and in the wick of the same, if said wick has been used before. This wick may then be lighted, and the capillary attraction will go on as usual, the heat from the flame being conducted, by means of the metal tubes of the burner, to the matter in the fountain, and keeping it in a liquid state.

After the lard or concrete substance in the upper fountain is a little melted, the lower or spirit lamp may be extinguished by turning a sliding lever valve, *g*, Fig. 3, so as to cover the opening or space *h* about the wick and wick tube of the lower fountain, which when so turned effectually prevents any evaporation of the liquid in said fountain. This lever valve *g*, has a fulcrum at *i*, as shown by dotted lines in Fig. 2, and is operated or turned by means of the bent handle *k*. A curved inclined spring *l*, attached at one end to the top of the fountain *e*, serves to keep the sliding valve in position, when it is turned off from the wick of the spirit lamp.

The spirit lamp, it will be seen, may be easily trimmed by unscrewing the main fountain &c which is provided for at *m*, see Fig. 2.

Having thus described my improvements I shall only claim as my invention—

1. Arranging or forming a trough *c*, on the exterior of the fountain, substantially in the manner and for the purpose herein before specified.

2. Also, the employment or arrangement of an auxiliary or secondary lamp (for the purpose of melting or liquefying the concrete substance in the main lamp), just beneath the fountain of said main lamp, and so that the flame of the former may extend up into the interior tube of the burner of the latter, the construction and operation of the same being substantially as herein above set forth.

3. I also claim, extinguishing the flame of the auxiliary lamp and preventing the evaporation of the liquid in the fountain of the same, by means of a sliding lever valve arranged and operating substantially as described.

In testimony that the foregoing is a true description of my said invention and improvements I have hereto set my signature this eighth day of April in the year eighteen hundred and forty two.

B. H. HORN.

Witnesses:
R. H. EDDY,
CALEB EDDY.